Dec. 27, 1960 M. HERVÉ 2,966,360
PICK-UP DEVICES
Filed March 17, 1958 3 Sheets-Sheet 1
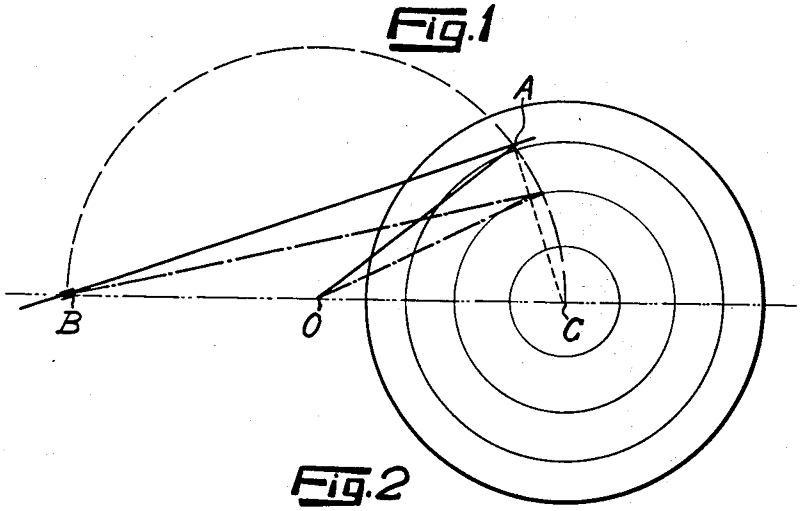
Fig. 1
Fig. 2
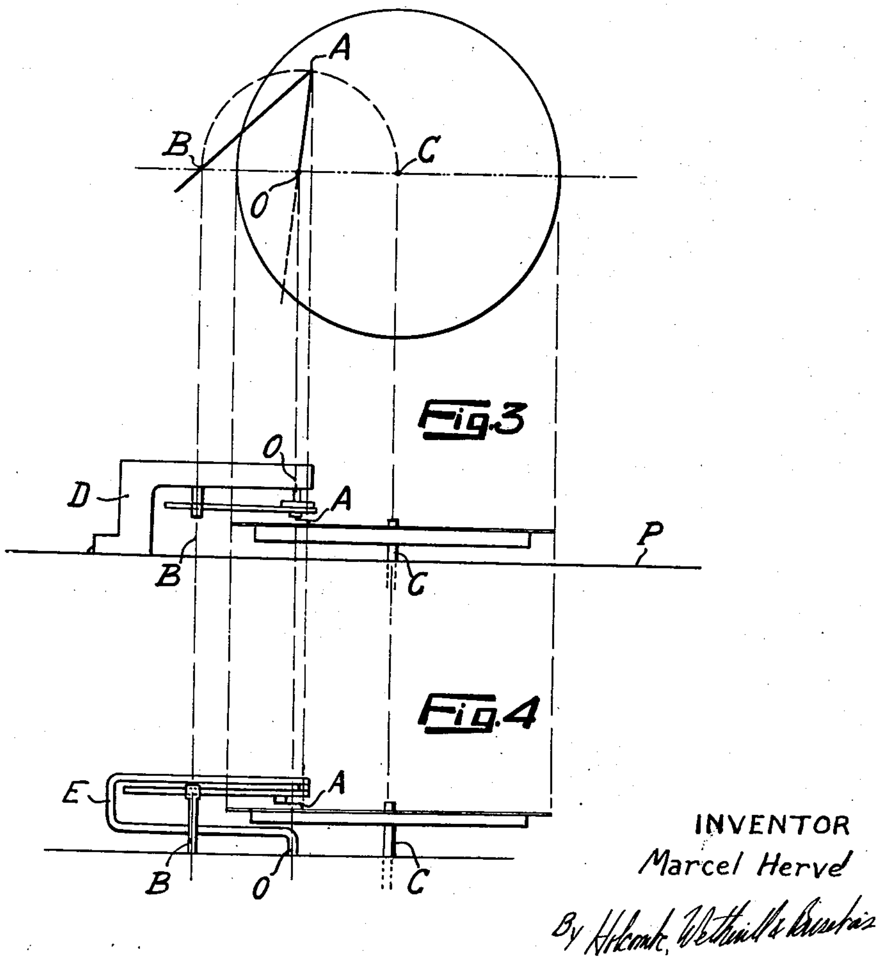
Fig. 3, Fig. 4
INVENTOR
Marcel Hervé
By Holcombe, Wetherill & Brisebois
ATTORNEYS Dec. 27, 1960

M. HERVÉ

2,966,360

PICK-UP DEVICES

Filed March 17, 1958

3 Sheets-Sheet 2

INVENTOR
Marcel Hervé
By Holcomb, Wetherill & Brisebois
ATTORNEYS

INVENTOR

Marcel Hervé

By Holcombe, Wetherill & Brisebois

ATTORNEYS

United States Patent Office 2,966,360

Patented Dec. 27, 1960

2,966,360

PICK-UP DEVICES

Marcel Hervé, 20 Rue Cujas, Paris, France

Filed Mar. 17, 1958, Ser. No. 722,026

Claims priority, application France Mar. 20, 1957

6 Claims. (Cl. 274—23)

Conventional gramophone record discs are generally produced by means of a cutting head or stylus which moves radially of the axis of rotation of the record disc as the record groove is cut, whereas reproducing styli such as metal needles or synthetic jewels, are carried by a pick-up arm or other support which pivots about an axis separate from the record axis and which therefore swings the reproducing stylus in an arc about the pivoting point. Therefore during most of the reproduction from the record the lateral excursions of the reproducing stylus occur at an angle to the lateral excursions of the recording stylus, due to the difference between the radial trajectory of the recording stylus and the arcuate trajectory of the reproducing stylus. This angle between the lateral excursions is known as the tracking error which can give rise to distortion in the reproduction of the record, and also produce accelerated wear of the record and reproducing stylus. Hitherto in order to reduce the effects of tracking error it has been usual to bend the free end of the pick-up arm, which does to some extent reduce this error, but in no way overcomes it.

In order to eliminate tracking error it is necessary that the reproducing stylus be maintained in a plane tangential to the part of the record groove being reproduced at any one time.

It is an object of the present invention to provide an improved construction of pick-up device in which tracking error is substantially reduced or eliminated.

It is a further object of this invention to provide a pick-up device comprising a pick-up arm, a stylus, pivotally supported from the pick-up arm, and means for adjusting the angle between the stylus support and the pick-up arm to maintain the stylus in a plane substantially tangential to a record groove throughout the reproduction of the record by the stylus.

Figures 5, 6:
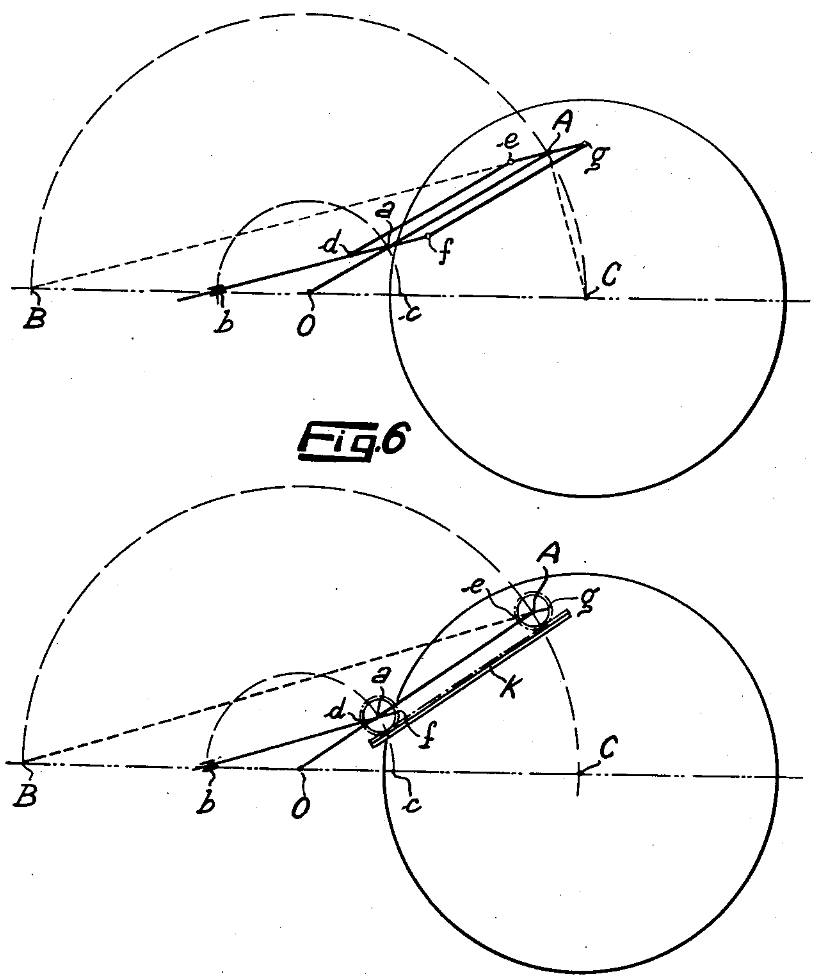
Figure 7:
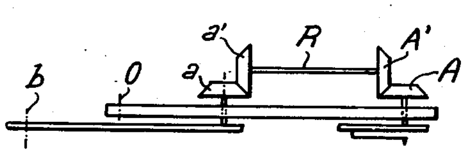
Figure 8:
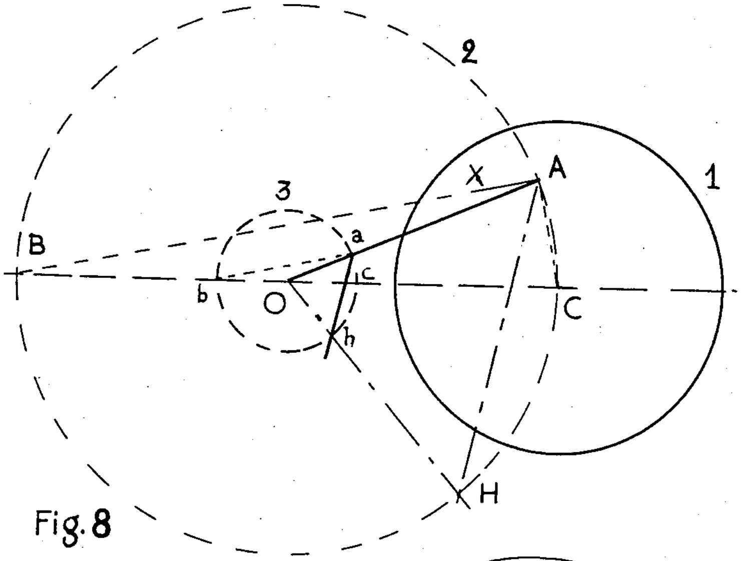
Figure 9:
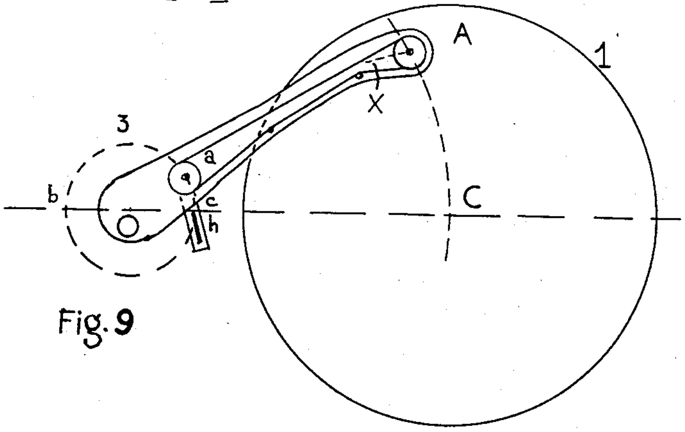
Figure 10:
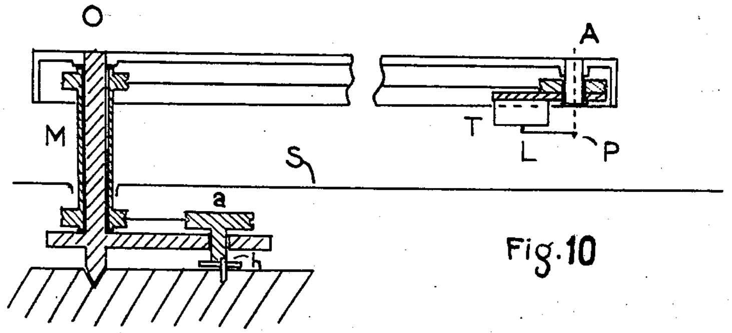

Other objects and advantages of this invention will appear hereinafter from the following description taken in conjunction with the accompanying drawings, in which:

Figure 1 illustrates the basic geometrical principles of which this invention is based, Figure 2 illustrates diagrammatically a practical form of the invention, Figures 3 and 4 illustrate two embodiments of pick-up device based on Figure 2, Figure 5 illustrates another construction of pick-up device according to this invention and the geometrical characteristics thereof, Figures 6 and 7 illustrate modifications of the type of construction illustrated in Figure 5, Figure 8 is a diagram of the geometrical principles employed in a further construction of pick-up device according to this invention, Figure 9 is an embodiment of pick-up device constructed according to the principles of Figure 8, and Figure 10 is a further embodiment of pick-up device employing the principles illustrated in Figure 8.

Figure 1 is explanatory and shows the basic geometric principles which this invention employs in order that the pick-up needle or stylus is maintained in a plane constantly tangential to the grooves of a gramophone record being produced, whatever may be the radius of the groove, whereby the lateral displacements of the needle or stylus take place along the radius to the groove.

The pick-up head is carried by an arm AB articulated at point A, set just above the reproducing stylus, to another arm AO pivoting around point O which is distinct, from the centre of rotation C of the record. This arm AO causes the stylus point to draw a circumference of centre O and of diameter BC. The points A B C and O are shown as situated in the plane of rotation of the record, but they may obviously be situated in a parallel plane, usually a horizontal plane, as is the plane of the record.

The segment AB, which is the longer of the two sides including the right angle A of the triangle B A C, is of variable length and is drawn on Figure 1 as free to move slidably at B.

With the arrangement of Fig. 1, the perpendicular at A to the arm AB passes through the centre C of the record during the whole duration of playing and the stylus carrier keeps constantly tangential at A to the record grooves. The arrangement shown effectively eliminates tracking error; but it is somewhat cumbersome due to the position of the sliding point B at some distance outside the circumference of the record, which requires that the distance BC is greater than the diameter of the largest record to be played.

Figures 2, 3 and 4 show arrangements which overcome this disadvantage, firstly by bringing point O nearer centre C (Fig. 2), which may be achieved in practice by arranging point B and O on a bracket or support D extending from B towards C (Fig. 3) above the record and fixed to the plate P supporting the turntable. The bracket D may be constructed so that it can be easily raised and turned around to facilitate positioning the stylus on and removing it from the record, as well as to facilitate the changing of the record and stylus.

According to another embodiment shown in Figure 4, the arm AO is of hair-pin shape as shown at E, so that it may extend around the edge of the record, point O is then placed below the turntable.

Figure 5 shows a plan view of a further embodiment, on which can be seen the main elements of the preceding figures, and the same use is made of the properties of a right-angled triangle A B C, to maintain the axis of a needle or stylus in a plane tangential to the tone grooves that have the common centre C of the record.

One end of the pick-up arm OA is articulated at the fixed point O, and at its other end is articulated a light stylus carrying member *eg*, bearing at its middle the stylus which enters into the groove of the record being played. The dotted line AB corresponds to the same straight segment bearing the same references in Figure 1; but instead of being constituted by an arm sliding at B as in Figure 1, the straight line AB is limited to the segment *eg*. In order to keep this segment tangential to the groove, it is kept constantly parallel to the arm *ab* of the triangle *abc* which is similar to triangle ABC. Three different ways of obtaining this result are shown respectively in Figures 5, 6 and 7.

In Figure 5 the movement is transmitted by two connecting rods *de* and *fg* (or only one need be employed). The points *defg* are the vertices of an articulated parallelogram which can easily be made and is light in weight.

In Figure 6 the movement from *ab* to *eg* is transmitted by a rack K, continually connected to two similar pinions A and *a* attached respectivedly to limbs *eg* and *df*. The rack K may be replaced by a chain or a belt.

Figures 5 and 6 are plan views of the above devices but Figure 7 is a side view of a modification showing bevel pinions A and *a* in place of the spur pinions of Fig. 6, these bevel pinions being engaged respectively by two corresponding and identical bevel pinions A' and *a'* which are rigidly connected together by a shaft R.

Figure 8, which is essentially theoretical, illustrates the geometric principles of a further embodiment of pick-up device according to this invention. The majority of its references apply to geometrical elements merely used for explanatory purpose, and the practical embodiments described later will not include any of the elements represented solely by broken lines in Figure 8. On the contrary the full lines of Figure 8 indicate the elements of that figure which will be included in the practical embodiments and which are the following:

(1) The circle with centre C which represents the contour or outline of the gramophone record.

(2) The vector OA which represents the rigid pick-up arm.

(3) The short segment AX which corresponds to the median line of a small bar articulated in A at the free end of the pick-up arm and bearing the transducer and stylus.

(4) The sliding arm *ah*, one end of which is articulated with the arm OA at a point *a* which moves on the circumference 3. This last indication only anticipates to a small extent the conclusions to be drawn from a more accurate examination of Figure 8.

All the broken lines of the said figure being acceptable in view of the general theoretical principles of the invention, it will be first observed that the median line AX is a short terminal segment of the chord AB of the circle 2, and that the triangle CAB inscribed in its half circumference, is right-angled at A, so that, being perpendicular at this point to the radius CA, the median line AX is, as is desired and necessary, tangential to any groove at every point of tracking, and the stylus is positioned on a vertical axis passing through A.

It should be noticed too, that similar relations do exist between the geometrical elements included respectively within the large circle 2 and within the small circle 3. This similarity is completed by drawing the chord *ab* of the circle 3, but it will be shown that it is more important to observe that the angle BAH is constant, the vertex of this angle generating the circumference of the circle 2, and the sides of which pass through two fixed points, B and H, on the same circumference. It is in fact of the constant value of this angle that the angular control of the median line AX is based.

In practice, as shown in Figure 9, a small bar AX is provided which is articulated at the end of the pick-up arm OA and bears transducer T which transforms into electric signals, the lateral displacement of the moving record grooves. These lateral displacements are transferred from the record to the transducer by means of the small lever LP, one extremity of which constitutes the stylus P. It will be observed that this small lever is displaced laterally, but that its average position or resting position is arranged in a vertical plane containing the median line of the pivoted bar AX and tangential to the record groove at P.

To obtain the desired adjustment of the bar AX as the stylus moves over the record groove, it would be sufficient rigidly to fix this bar to a rod AH capable of sliding at H (Fig. 8), but the controlling action may be derived with advantage from the small circle 3. This is possible by substituting a homothetic member *ah* for the rod AH. The homothetic member *ah*, consists of a lever articulated at a point *a* on the arm OA and on the circle 3, and passing through a fixed point *h* on the same circle 3 and slidable through this point.

It results therefore that the problem of tracking is solved if: the angle between *ah* and AX (the only segment of AB being retained and forming part of the stylus carrier) is kept constant: This can be effected by numerous different means: such as rods, gears, belts and pulleys etc. These transmission means could be eliminated by choosing the diameter O*c* equal to the diameter OC; but it would then be necessary to employ a component AH, and the system thus obtained would be cumbersome.

It has been seen that chord AH, of circle 2 as well as its homothetic *ah*, have been chosen quite arbitrarily and it will be appreciated that there are numerous other possible embodiments. For instance the points H and *h* could be made arbitrarily the same as the points C and *c*. Furthermore if points H and *h* were positioned respectively at B and *b*, the arrangement shown in Figure 1 would be obtained.

Figure 9 shows a plan view from above of a gramophone record and its pick-up arm, and the references on this figure given to the various parts correspond to the references in Figure 8. The drive from slidable arm *ah* to pivoted bar AX is effected by means of two similar pulleys around which passes an endless belt or cord.

Figure 10 shows a side view of a pick-up arm, in which the sliding rod *ah* has been positioned under the turntable S. Its angular motion is transmitted to the bar AX by means of two rigidly fastened pulleys having the same vertical axis O. To this arrangement is added an articulated shaft and sleeve M, to allow the lifting of the free end of the pick-up arm, so as to move it on or off a record, and to facilitate changes of record or stylus. The sleeve M may consist of a helical spring with continuous turns, and the axial rod may be constructed to hinge about a horizontal axis.

Whilst particular embodiments have been described, it will be understood that various modifications may be made without departing from the scope of this invention. It will also be appreciated that this invention may be applied to other similar devices where it is desired to eliminate tracking errors.

I claim:

1. A gramophone pick-up device in which tracking error is substantially eliminated comprising a pick-up arm adapted to pivot about an axis O adjacent one end, a stylus carrying member pivoted adjacent the other end A of the pick-up arm, a further member pivotally mounted at A on said pick-up arm intermediate the said two ends and connected to said stylus carrying member by a linkage mechanism causing movement of said stylus carrying member with pivotal movement of said further member, said further member including an extension portion slidably received within a support *b* (Fig. 5) adapted to be mounted on a line CB passing through the pivotal axis of the pick-up and the axis of rotation of a record to be reproduced, whereby the stylus carrying member is maintained substantially tangential to the record groove with movement of the pick-up arm over the record.

2. A gramophone pick-up device in which tracking error is substantially eliminated, comprising a pick-up arm adapted to pivot about an axis adjacent one end, a stylus carrying member pivoted adjacent the other end of the pick-up arm, a further member pivotally mounted on said pick-up arm intermediate the said two ends and connected to said stylus carrying member by a linkage mechanism constituting an articulated parallelogram and causing movement of said stylus carrying member with the pivotal movement of said further member, said further member including an extension portion slidably received by a support adapted to be mounted on a line passing through the pivotal axis of the pick-up and the axis of rotation of a record to be reproduced, whereby the stylus carrying member is maintained substantially tangential to the record groove with movement of the pick-up arm over the record.

3. A gramophone pick-up device in which tracking error is substantially eliminated, comprising a pick-up arm adapted to pivot about an axis adjacent one end, a stylus carrying member including a pinion pivoted adjacent the other end of the pick-up arm, a further member including a pinion pivotally mounted on said pick-up arm intermediate the said two ends and connected to said stylus carrying member by a linkage mechanism interconnecting the two pinions and causing movement of said stylus carrying member with the pivotal movement of said further member, said further member also including an extension portion slidably received by a support adapted to be mounted on a line passing through the pivotal axis of the pick-up and the axis of rotation of a record to be reproduced, whereby the stylus carrying member is maintained substantially tangential to the record groove with movement of the pick-up arm over the record.

4. A pick-up device consisting of a pick-up arm pivoted adjacent one of its ends about an axis O, a stylus carrying member A*x* pivotally mounted adjacent the other end of the pick-up arm, a further member *ah* pivotally mounted at *a* on said pick-up arm intermediate the two ends and extending away from said pick-up arm towards a guide fixed relative to the pivotal axis of said pick-up arm and located on a line passing through said pivotal axis so that said further member can slide relative to said guide, and means interconnecting the stylus carrying member and intermediate member for transmitting the movement of said intermediate member to the stylus carrying member as said pick-up arm rotates about its axis.

5. A pick-up device as claimed in claim 4, in which said interconnecting means comprises a cord and pulley arrangement.

6. A gramophone pick-up device in which tracking error is substantially eliminated, comprising a pick-up arm adapted to pivot about an axis adjacent one end, a stylus carrying member pivoted adjacent the other end of the pick-up arm, a further member pivotally mounted on said pick-up arm intermediate the said two ends and on a straight line passing through the pivot points for said pick-up arm and said stylus carrying member, a linkage mechanism connecting said further member and said stylus carrying member and causing movement of said stylus carrying member with the pivotal movement of said further member, said further member including a straight extension portion slidably received by a guide adapted to be mounted at a point on a circle whose centre is the pivot point for said pick-up arm and whose circumference passes through the pivot point for said further member whereby the stylus carrying member is maintained substantially tangential to the record groove with movement of the pick-up arm over the record.

References Cited in the file of this patent

UNITED STATES PATENTS

| | | |
|---|---|---|
| 2,455,529 | Shortt | Dec. 7, 1948 |
| 2,516,565 | Guy | July 25, 1950 |